(12) United States Patent
Hayakawa et al.

(10) Patent No.: US 7,663,067 B2
(45) Date of Patent: Feb. 16, 2010

(54) WEIGHING DEVICE HAVING GATES FOR CASTING ARTICLE ONTO CENTER AREA OF DISPERSAL TABLE, AND METHOD OF DRIVING GATES OF WEIGHING DEVICE

(75) Inventors: Teruo Hayakawa, Shiga (JP); Takao Kihara, Shiga (JP); Noboru Kobayashi, Shiga (JP); Satoshi Takada, Shiga (JP); Koichi Makino, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 24 days.

(21) Appl. No.: 12/067,740

(22) PCT Filed: Aug. 9, 2007

(86) PCT No.: PCT/JP2007/000858

§ 371 (c)(1),
(2), (4) Date: Mar. 21, 2008

(87) PCT Pub. No.: WO2008/018180

PCT Pub. Date: Feb. 14, 2008

(65) Prior Publication Data

US 2009/0178861 A1    Jul. 16, 2009

(30) Foreign Application Priority Data

Aug. 10, 2006  (JP)  ............... 2006-219022
Aug. 10, 2006  (JP)  ............... 2006-219029

(51) Int. Cl.
*G01G 19/387*  (2006.01)
*G01G 13/08*   (2006.01)

(52) U.S. Cl. ............... 177/25.18; 177/105; 177/121; 198/530; 198/532

(58) Field of Classification Search ............... 177/25.18, 177/105, 120, 121; 198/530–532
See application file for complete search history.

(56) References Cited

U.S. PATENT DOCUMENTS 3,695,371 A * 10/1972 Sheetz ..................... 177/59
4,607,713 A *  8/1986 Nishi et al. ............... 177/25.18

FOREIGN PATENT DOCUMENTS

| JP | H02-656     | Y2 |   1/1990 |
|----|-------------|----|----------|
| JP | H03-74774   | B2 |  11/1991 |
| JP | H06-2118    | Y2 |   1/1994 |
| JP | H06-29696   | Y2 |   8/1994 |
| JP | 2003-341826 | A  |  12/2003 |
| JP | 2008-196978 | A * |  8/2008 |

\* cited by examiner

*Primary Examiner*—Randy W Gibson
(74) *Attorney, Agent, or Firm*—Global IP Counselors, LLP

(57) ABSTRACT

A first gate opens obliquely downward, and maintains the posture, rendering the slope angle of the bottom surface thereof steeper than that of the bottom surface of the second gate. Thus, the bottom surface of the second gate forms a gentle slope sliding surface, and the bottom surface of the first gate forms a steep slope sliding surface. Then articles drop following the shape of a parabola toward the bottom surface of the first gate on the steep slope side, with momentum gained from sliding down the bottom surface of the second gate on the gentle slope side, and then change the sliding trajectory inward upon bumping into the bottom surface of the first gate. The articles then drop following the shape of a parabola toward the center area of a dispersal table, with momentum gained from sliding down the bottom surface of the first gate.

8 Claims, 15 Drawing Sheets

WEIGHING DEVICE HAVING GATES FOR CASTING ARTICLE ONTO CENTER AREA OF DISPERSAL TABLE, AND METHOD OF DRIVING GATES OF WEIGHING DEVICE

CROSS-REFERENCE TO RELATED APPLICATIONS

This U.S. national phase application claims priority to Japanese Patent Application Nos. 2006-219022 and 2006-219029 filed on Aug. 10, 2006. The entire disclosures of Japanese Patent Application Nos. 2006-219022 and 2006-219029 are hereby incorporated herein by reference.

TECHNICAL FIELD

The present invention relates to a weighing device, and more particularly, to a structure of an article supplying device in a combination weighing device.

BACKGROUND ART

A conventional combination weighing device including an article supplying device for supplying articles to a dispersal table by opening and closing a gate is disclosed in Japanese Utility Model Examined Application Publication No. H6-2118 (1994), for example.

FIG. 15 is a top view schematically showing a part of a structure of a conventional combination weighing device. A plurality number (sixteen in this example) of feed troughs 601-616 are arranged along a circumference of a dispersal table 4 having a partition 5, and an article supplying device 102 to cast articles onto the dispersal table 4 is arranged above the dispersal table 4. The article supplying device 102 includes a pair of gates 103A and 103B capable of independently opening and closing.

DISCLOSURE OF INVENTION

FIG. 16 is a side view showing the gate 103B in FIG. 15 being open. When the gate 103B is opened, articles accumulated in the article supplying device 102 slide down a slope of the closed gate 103A, and then drop approximately parabolically. Thus, as shown in FIG. 16, many articles 150 drop slightly away from the center of the dispersal table 4 as viewed from the side of the gate 103A. Consequently, among the feed troughs 601-608 on the right half in FIG. 15, the feed troughs 601 and 608 located at the end are supplied with fewer articles compared to the others, and the feed troughs 604 and 605 located in the middle are supplied with more articles compared to the others, causing variation in the amount of supply of articles among each of the feed troughs 601-608. As a result, a problem, such as deterioration of accuracy in weighing or decrease in a rate of operation, arises for a whole combination weighing device.

The present invention has been made to solve such a problem, and is directed to obtaining a weighing device including an article supplying device capable of supplying a plurality of feed troughs each with even articles.

A weighing device according to a first aspect of the invention includes a dispersal table, a plurality of feeding sections arranged along a circumference of the dispersal table, a weighing section respectively arranged below each of the feeding sections, and a casting unit arranged above the dispersal table to cast an article onto the dispersal table, the casting unit including a pair of gates arranged to open and close independently so that a sliding trajectory of the article that has slid down one of the gates forming a gentle slope sliding surface changes upon the article bumping into an opposing one of the gates forming a steep slope sliding surface to drop the article toward a center area of the dispersal table.

A weighing device according to a second aspect of the invention is the weighing device according to the first aspect of the invention, wherein each of the gates is opened and closed in such a way that a bottom edge of the gate follows trajectory approximately in the shape of a parabola being convex upward upon opening and closing.

A weighing device according to a third aspect of the invention is the weighing device according to the first aspect of the invention, wherein each of the gates generally has a hollow inverted semicone shape.

A weighing device according to a fourth aspect of the invention includes a dispersal table, a plurality of feeding sections arranged along a circumference of the dispersal table, a weighing section respectively arranged below each of the feeding sections, and a casting unit arranged above the dispersal table to cast an article onto the dispersal table, the casting unit including a pair of gates with a slope angle of each of the gates being changeable so that a sliding trajectory of the article that has slid down one of the gates forming a gentle slope sliding surface changes upon the article bumping into an opposing one of the gates forming a steep slope sliding surface to drop the article toward a center area of the dispersal table.

A weighing device according to a fifth aspect of the invention is the weighing device according to the fourth aspect of the invention, wherein an open area of a slot formed between the gates of the casting unit is adjusted by adjusting the slope angle of the one of the gates forming the steep slope sliding surface.

A weighing device according to a sixth aspect of the invention is the weighing device according to the fourth aspect of the invention, wherein the slope angle of the opposing one of the gates forming the gentle slope sliding surface is adjusted corresponding to stickiness of the article.

In the weighing device according to the first aspect of the invention, one of the pair of gates opens, so that an article slides down the other gate on the gentle slope side, changes sliding trajectory upon bumping into the opposing gate on the steep slope side, and drops toward the center area of the dispersal table. Thus, articles can be evenly supplied for each of the plurality of feeding sections arranged along the circumference of the dispersal table, thereby achieving even supply of articles for each of the plurality of weighing sections. As a result, accuracy in weighing and a rate of operation of a whole combination weighing device can be improved.

In the weighing device according to the second aspect of the invention, even if articles are piled up at the center area of the dispersal table, by opening and closing the gates in such a way that a bottom edge of the gate follows trajectory approximately in the shape of a parabola being convex upward, contact between the bottom edge of the gate and the pile of the articles can be avoided, thus preventing the articles from being caught by the gate.

In the weighing device according to the third aspect of the invention, due to the shape of each gate being approximately like an inverted semicone, more articles are supplied toward the center area of the dispersal table, and thus articles can be supplied for each of the plurality of feeding sections evenly.

In the weighing device according to the fourth aspect of the invention, an article slides down the gate on the gentle slope side, changes sliding trajectory upon bumping into the opposing gate on the steep slope side, and drops toward the center area of the dispersal table. Thus, articles can be evenly supplied for each of the plurality of feeding sections arranged along the circumference of the dispersal table, thereby achieving even supply of articles for each of the plurality of weighing sections. As a result, accuracy in weighing and a rate of operation of a whole combination weighing device can be improved.

In the weighing device according to the fifth aspect of the invention, the open area of the slot of the casting unit is adjusted by adjusting the slope angle of the gate on the steep slope side. Thereby, arbitrary adjustment of an amount of articles cast from the casting unit onto the dispersal table is achieved.

In the weighing device according to the sixth aspect of the invention, the slope angle of the gate on the gentle slope side is adjusted corresponding to stickiness of the article. Thus by setting the slope at a steep angle for a sticky article, and setting the slope at a gentle angle for a less sticky article, an amount of articles cast from the casting unit onto the dispersal table is maintained evenly regardless of the stickiness of the articles.

BEST MODE FOR CARRYING OUT THE INVENTION

Figure 1:
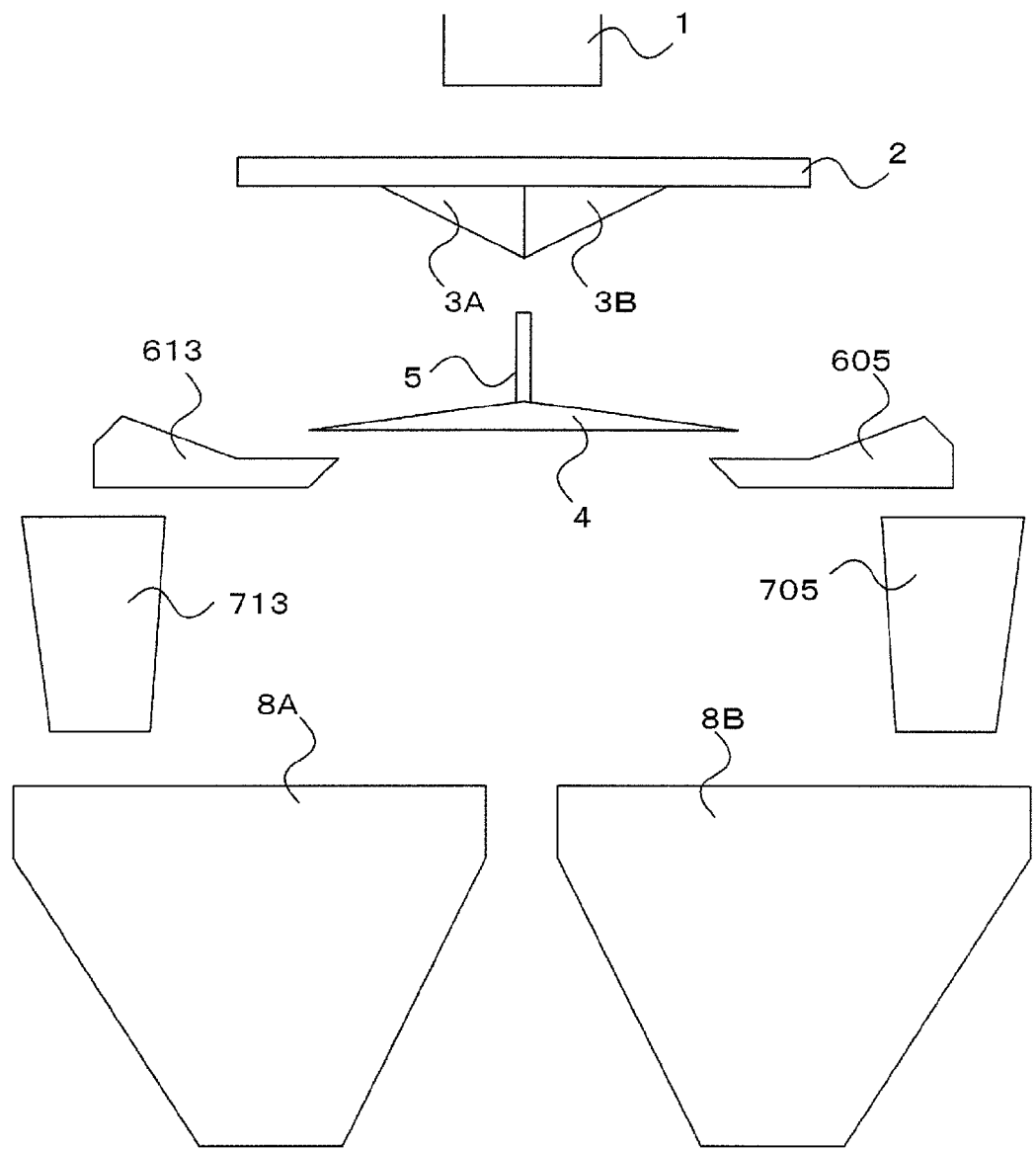
FIG. 1 is a side view schematically showing an overall structure of a combination weighing device according to a first embodiment of the present invention.

Embodiments of the present invention are explained using drawings in detail below. It should be noted that identical reference numerals throughout the drawings indicate identical or equivalent elements.

First Embodiment

FIG. 1 is a side view schematically showing a whole structure of a combination weighing device according to a first embodiment of the present invention. An article supplying device 2 is arranged below a feeder 1, and a dispersal table 4 is arranged below the article supplying device 2. A plurality of feed troughs 6 (605 and 613 in FIG. 1) is arranged along the circumference of the dispersal table 4, and a plurality of weighing sections 7 (705 and 713 in FIG. 1) having a pool hopper, a weighing hopper, and the like are respectively arranged below the feed troughs 6. In addition, collection chutes 8A and 8B are arranged below the weighing sections 7. Here, the feed troughs 6 function as supplying or feeding sections to supply articles to the weighing sections 7. In addition, the article supplying device 2 functions as a casting unit to cast or discharge the articles onto the dispersal table 4.

Figure 2:
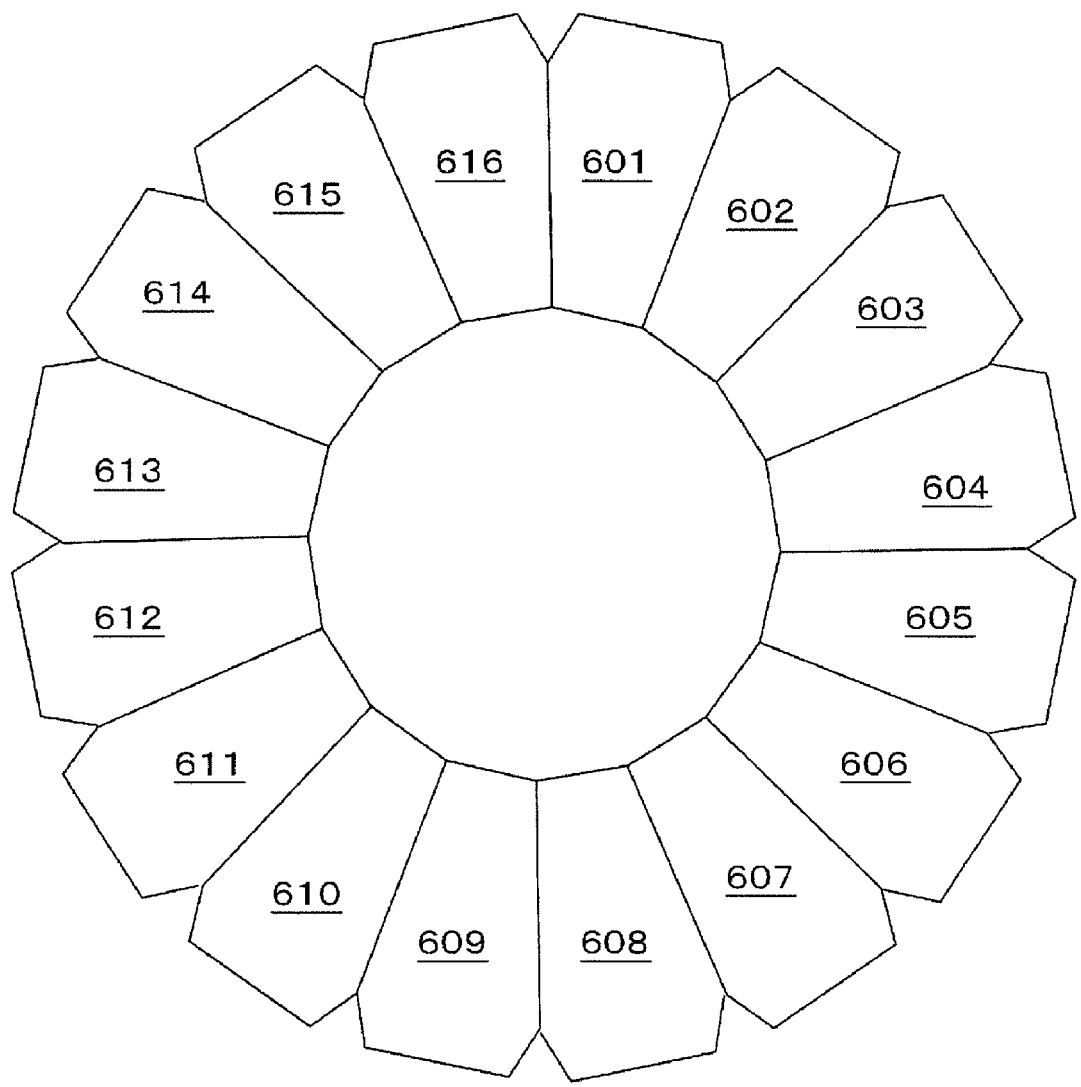
FIG. 2 is a top view showing an arrangement of a plurality of feed troughs according to the first embodiment.

FIG. 2 is a top view showing arrangement of the plurality of feed troughs 6 (601-616 in FIG. 2) in a combination weighing device of 16-head circular array. As shown in FIG. 2, sixteen feed troughs 601-616 line up radially in the combination weighing device of 16-head circular array.

Figure 3:
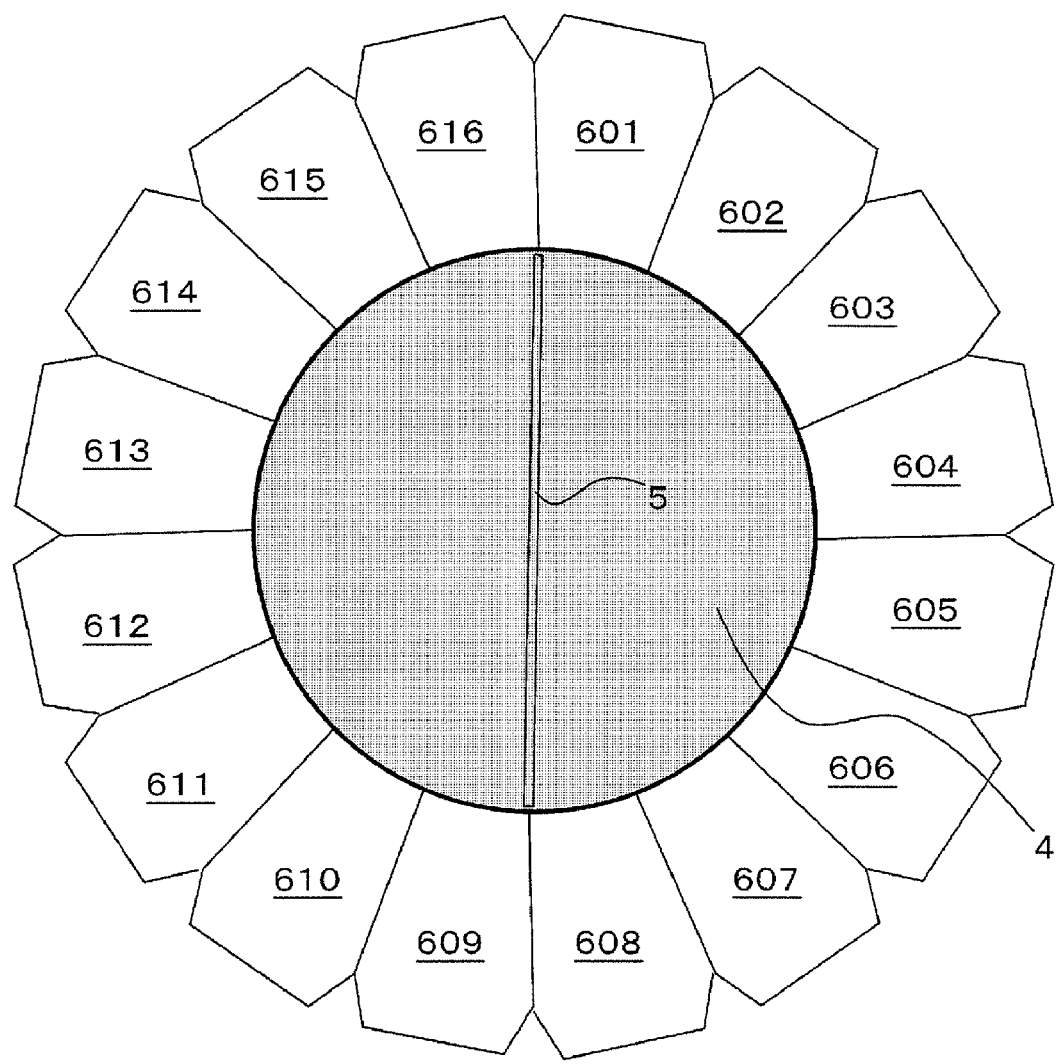
FIG. 3 is a top view showing a dispersal table laid on top of FIG. 2 according to the first embodiment.

FIG. 3 is a top view showing the dispersal table 4 laid on top of FIG. 2. A partition 5 is formed in the middle of a top surface of the dispersal table 4, and the sixteen feed troughs 601-616 are divided into eight feed troughs 601-608 on the right half and eight feed troughs 609-616 on the left half by this partition 5.

Figure 4:
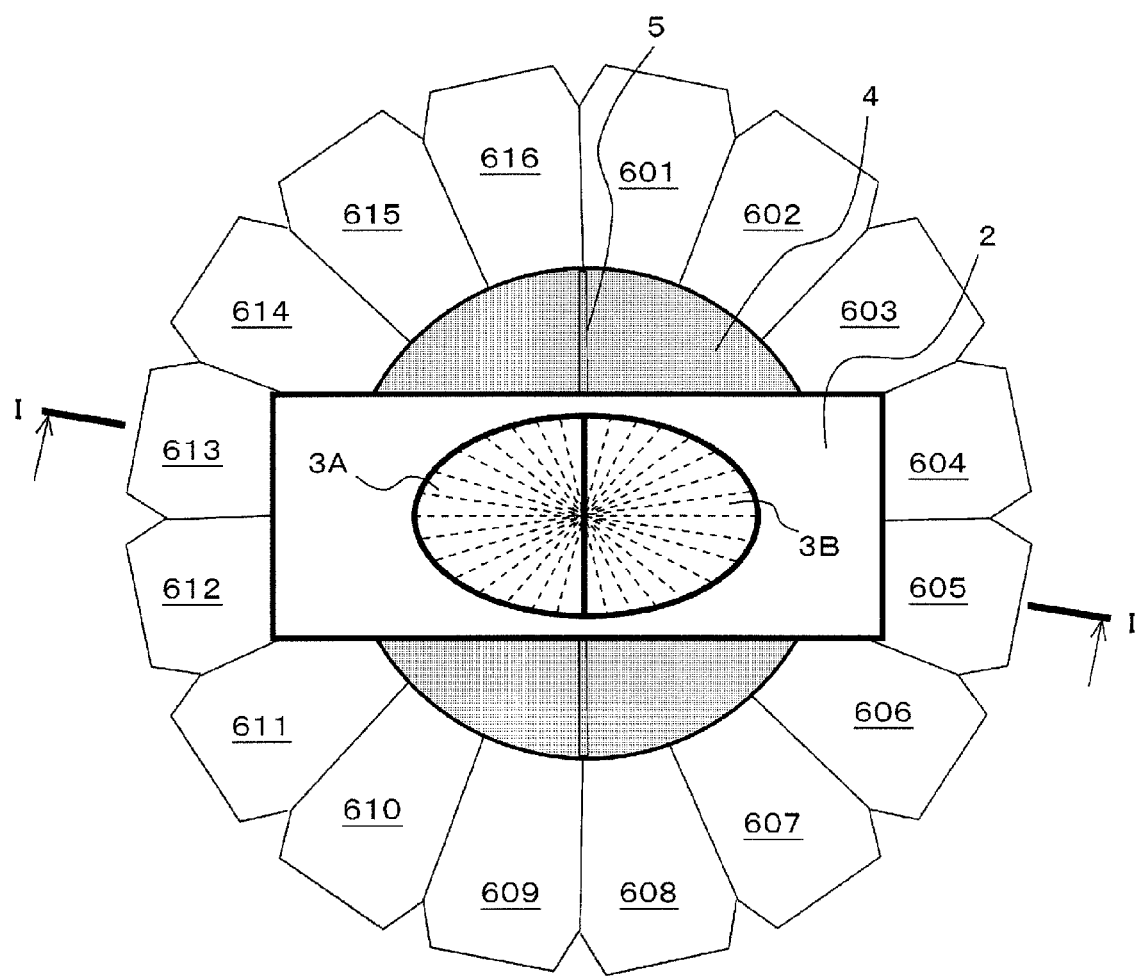
FIG. 4 is a top view showing an article supplying device laid on top of FIG. 3 according to the first embodiment.

FIG. 4 is a top view showing the article supplying device 2 laid on top of FIG. 3. A cross-sectional view along the line I-I in FIG. 4 corresponds to FIG. 1. Referring to FIGS. 1 and 4, the article supplying device 2 includes a gate 3A corresponding to the left half of the dispersal table 4 and a gate 3B corresponding to the right half. The pair of gates 3A and 3B is capable of opening and closing independently of each other.

Figure 5:
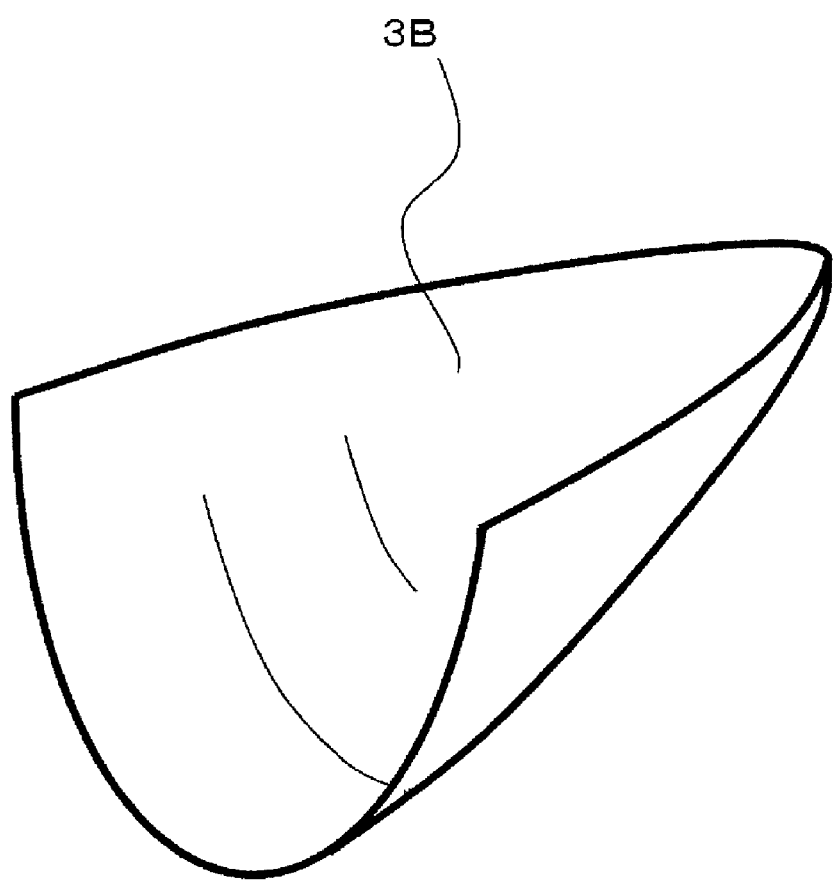
FIG. 5 is a perspective view showing a structure of a gate of an article supplying device according to the first embodiment.

FIG. 5 is a perspective view showing a structure of the gate 3B. As shown in FIG. 5, the gate 3B has an open top surface of an approximately semielliptical shape and an open side surface of also an approximately semielliptical shape, and is approximately shaped like a hollow inverted semicone with the inside being deeper than the outside, as a whole. In addition, a structure of the gate 3A is the same as that of the gate 3B. Here, the shape of a cross-section (a cross-section parallel to the open top surface or the open side surface) of the gates 3A and 3B is not limited to the above example of approximately semielliptical shape, but may be an arbitrary rectangle. Gates 3A and 3B in such a shape are fabricated by bending a quadrangular (or an arbitrary polygonal) plate-like body.

Figure 6:
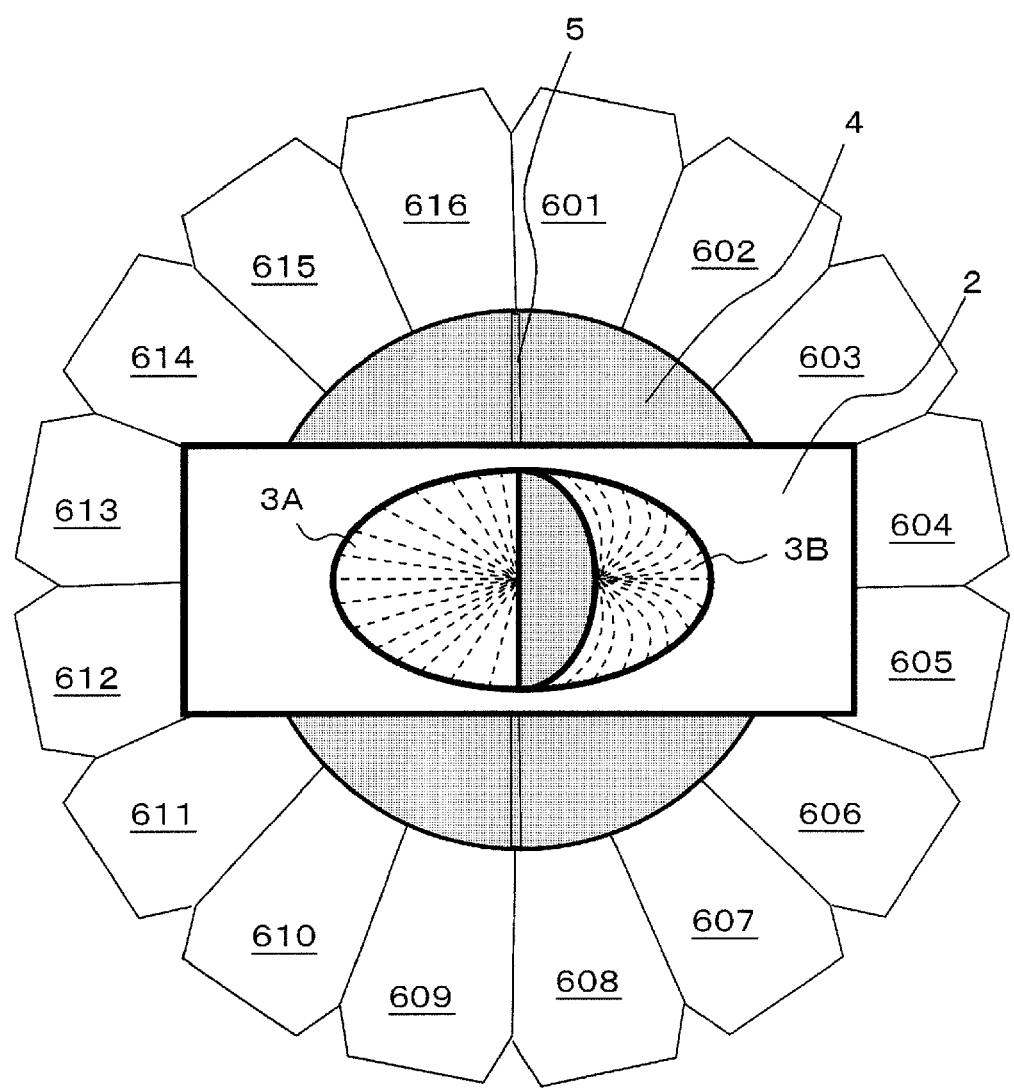
FIG. 6 is a top view showing an article supplying device with one of the gates being open according to the first embodiment.
Figure 7:
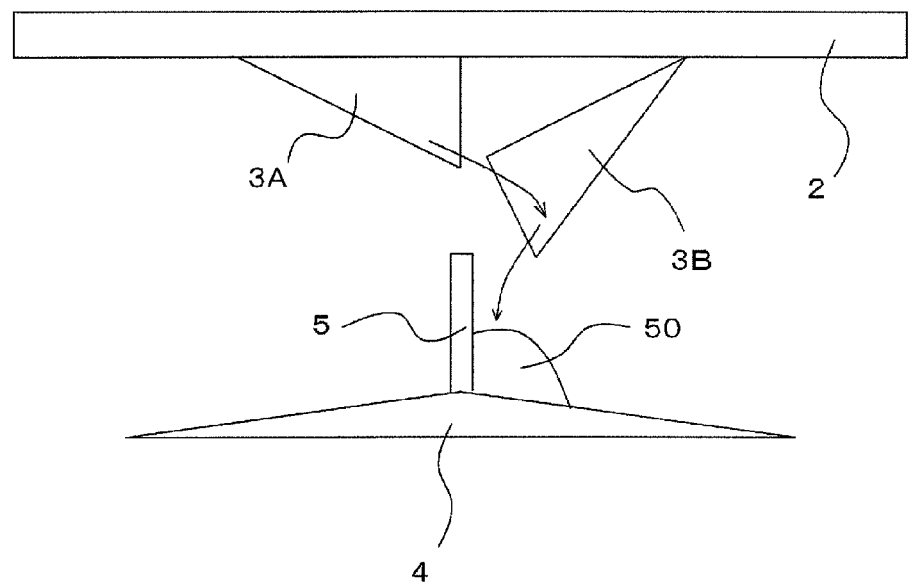
FIG. 7 is a side view showing an article supplying device with one of the gates being open according to the first embodiment.

FIG. 6 is a top view showing the gate 3B being open, out of the pair of gates 3A and 3B, and FIG. 7 is a corresponding side view. Referring to FIG. 7, the gate 3B opens obliquely downward from a state in FIG. 1, and maintains the posture, rendering the slope angle of the bottom surface of the gate 3B steeper than that of the bottom surface of the gate 3A. In other words, the bottom surface of the gate 3A forms a gentle slope sliding surface, and the bottom surface of the gate 3B forms a steep slope sliding surface. As indicated by an arrow in FIG. 7, articles 50 accumulated in the article supplying device 2 drop following the shape of a parabola toward the bottom surface of the opposing gate 3B on the steep slope side, with momentum gained from sliding down the bottom surface of the gate 3A on the gentle slope side, and then change the sliding trajectory inward upon bumping into the bottom surface of the gate 3B. The articles 50 then drop following the shape of a parabola toward the center area of the dispersal table 4, with momentum gained from sliding down the bottom surface of the gate 3B. As a result, articles 50 are piled up at the center area of the dispersal table 4 as shown in FIG. 7.

Figure 8:
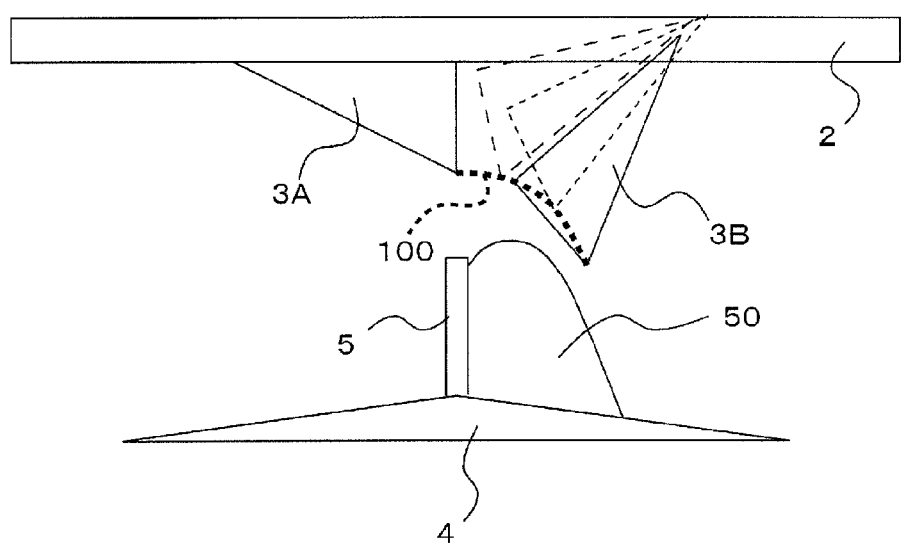
FIG. 8 is a side view showing a desirable trajectory of the gate of an article supplying device according to the first embodiment.

Referring to FIG. 8, when articles 50 are piled up highly at the center area of the dispersal table 4, it is anticipated that the bottom edge of the gate 3B contacts the top of the pile of articles 50 upon opening and closing of the gate 3B. Hence the gate 3B is opened and closed desirably in such a way that the bottom edge of the gate 3B follows a trajectory approximately in the shape of a parabola being convex upward, as shown by the broken line 100 in FIG. 8. The trajectory shown by the broken line 100 can be realized by moving the fulcrum of rotation of the gate 3B (the top right vertex of the gate 3B in FIG. 8) up and down according to an angle of rotation of the gate 3B, rather than fixing the fulcrum of rotation. Thereby, contact between the bottom edge of the gate 3B and the pile of articles 50 can be avoided, thus preventing articles 50 from being caught by the gate 3B.

In this way, according to the article supplying device 2 of the weighing device in the first embodiment, the gate 3B opens, so that articles 50 slide down the gate 3A on the gentle slope side, change sliding trajectory upon bumping into the opposing gate 3B on the steep slope side, and drop toward the center area of the dispersal table 4. Thus, articles 50 can be evenly supplied for each of the plurality of feed troughs 6 arranged along the circumference of the dispersal table 4, thereby achieving even supply of the articles 50 for each of the plurality of weighing sections 7. As a result, accuracy in weighing and a rate of operation of a whole combination weighing device can be improved.

In addition, due to the shape of the gate 3B being approximately like an inverted semicone as shown in FIG. 5, more articles 50 are supplied toward the center area of the dispersal table 4, and thus the articles 50 can be supplied for each of the plurality of feed troughs 6 evenly.

Since the movement of the gate 3B is described in the above explanation and the movement of the gate 3A is basically the same, repetition of explanation is omitted.

Second Embodiment

Figure 9:
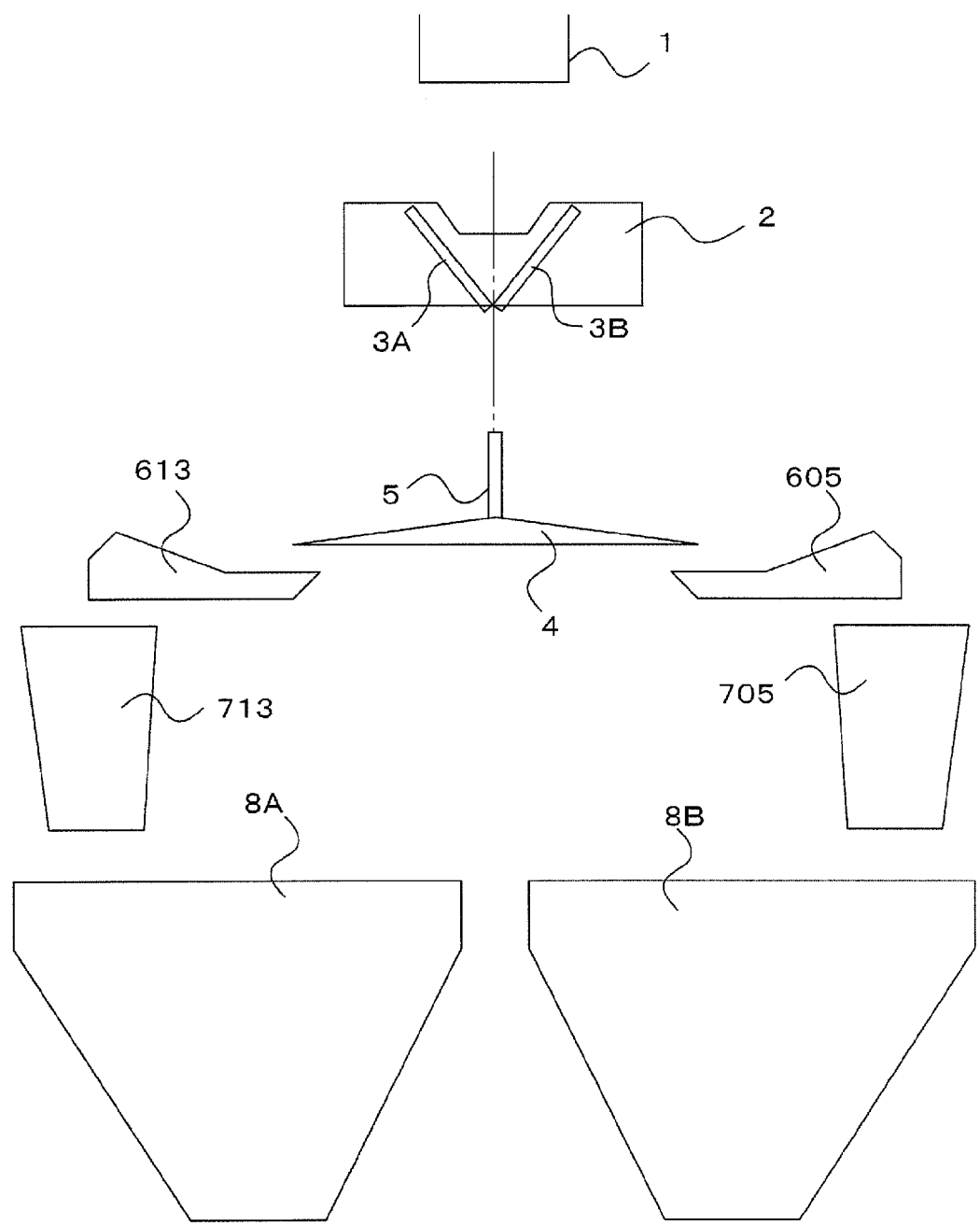
FIG. 9 is a side view schematically showing an overall structure of a combination weighing device according to a second embodiment of the present invention.

FIG. 9 is a side view schematically showing a whole structure of a combination weighing device according to a second embodiment of the present invention. An article supplying device 2 is arranged below a feeder 1, and a dispersal table 4 is arranged below the article supplying device 2. A plurality of feed troughs 6 (605 and 613 in FIG. 9) is arranged along the circumference of the dispersal table 4, and a plurality of weighing sections 7 (705 and 713 in FIG. 9) having a pool hopper, a weighing hopper, and the like are respectively arranged below the feed troughs 6. In addition, collection chutes 8A and 8B are arranged below the weighing sections 7. Here, the feed troughs 6 function as supplying or feeding sections to supply articles to the weighing sections 7. In addition, the article supplying device 2 functions as a casting unit to cast or discharge the articles onto the dispersal table 4.

Figure 10:
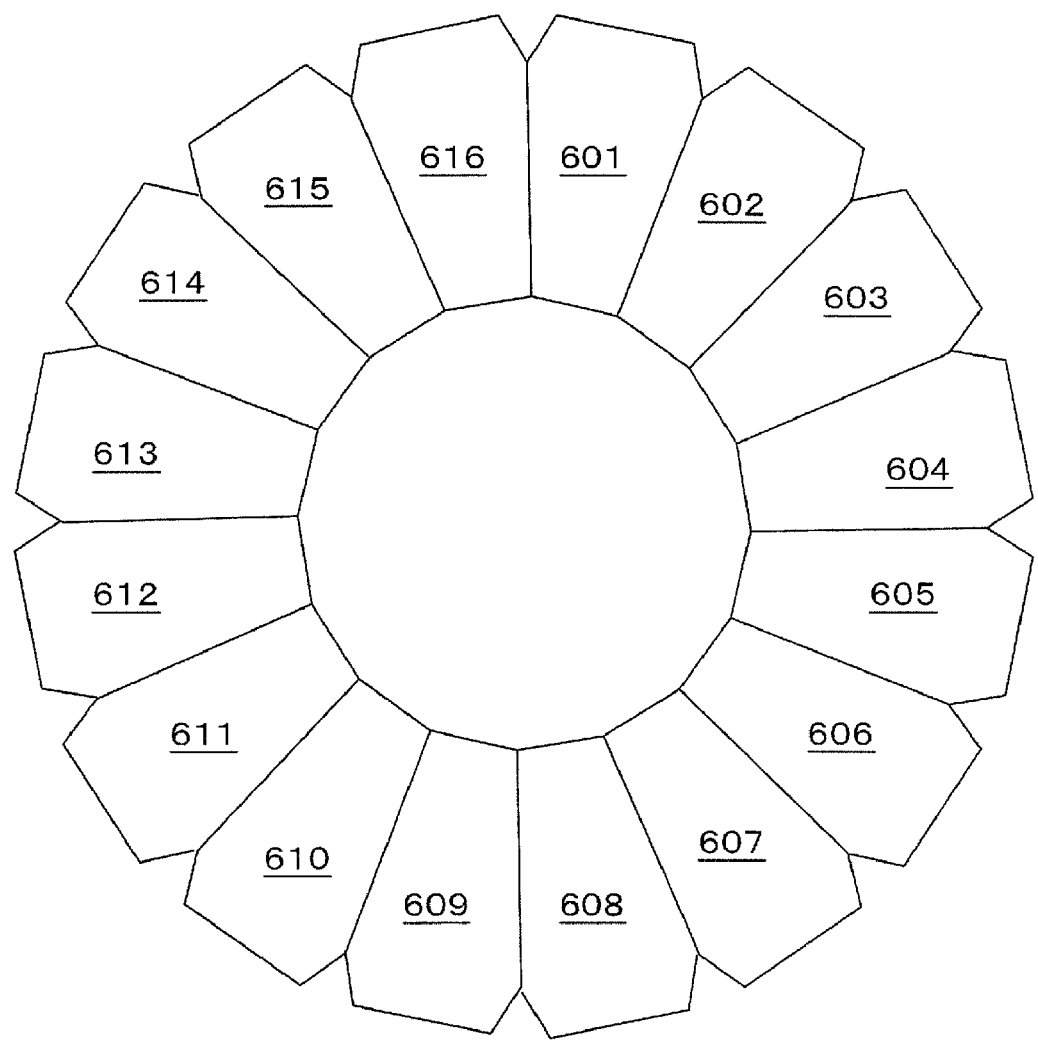
FIG. 10 is a top view showing arrangement of a plurality of feed troughs according to the second embodiment.

FIG. 10 is a top view showing arrangement of the plurality of feed troughs 6 (601-616 in FIG. 10) in a combination weighing device of 16-head circular array. As shown in FIG. 10, sixteen feed troughs 601-616 line up radially in the combination weighing device of 16-head circular array.

Figure 11:
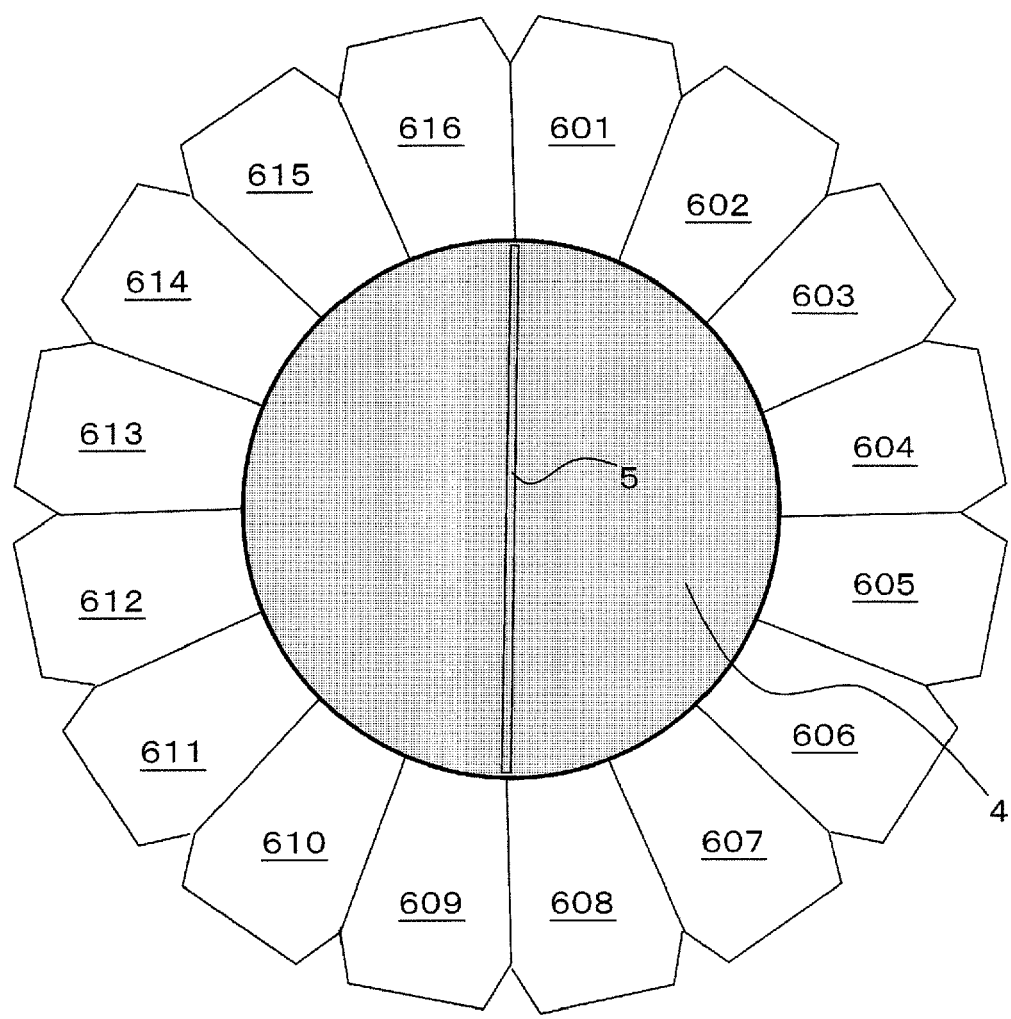
FIG. 11 is a top view showing a dispersal table laid on top of FIG. 10 according to the second embodiment.

FIG. 11 is a top view showing the dispersal table 4 laid on top of FIG. 10. A partition 5 is formed in the middle of a top surface of the dispersal table 4, and the sixteen feed troughs 601-616 are divided into eight feed troughs 601-608 on the right half and eight feed troughs 609-616 on the left half by this partition 5.

Figure 12:
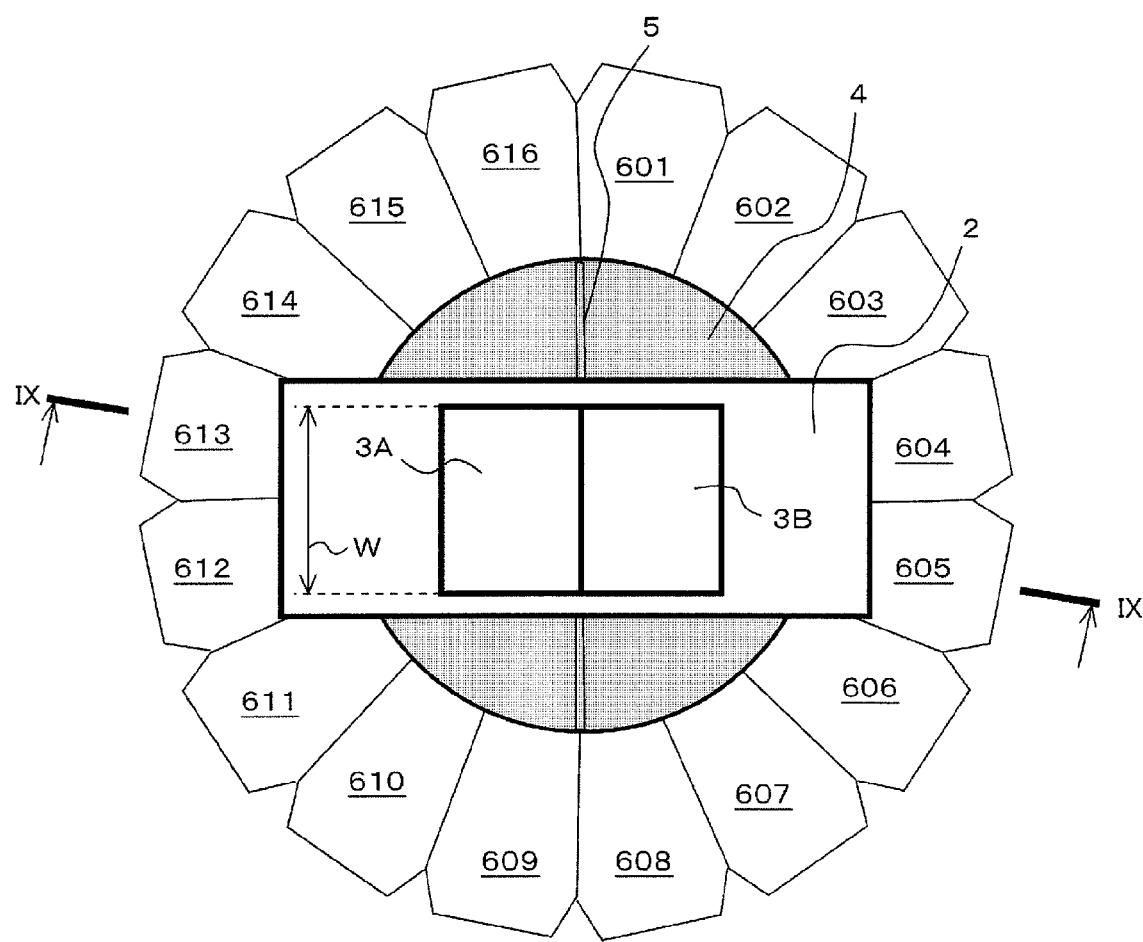
FIG. 12 is a top view showing an article supplying device laid on top of FIG. 11 according to the second embodiment.

FIG. 12 is a top view showing the article supplying device 2 laid on top of FIG. 11. A cross-sectional view along the line IX-IX in FIG. 12 corresponds to FIG. 9. Referring to FIGS. 9 and 12, the article supplying device 2 includes a gate 3A corresponding to the left half of the dispersal table 4 and a gate 3B corresponding to the right half. The pair of gates 3A and 3B is capable of opening and closing independently of each other.

Figure 13:
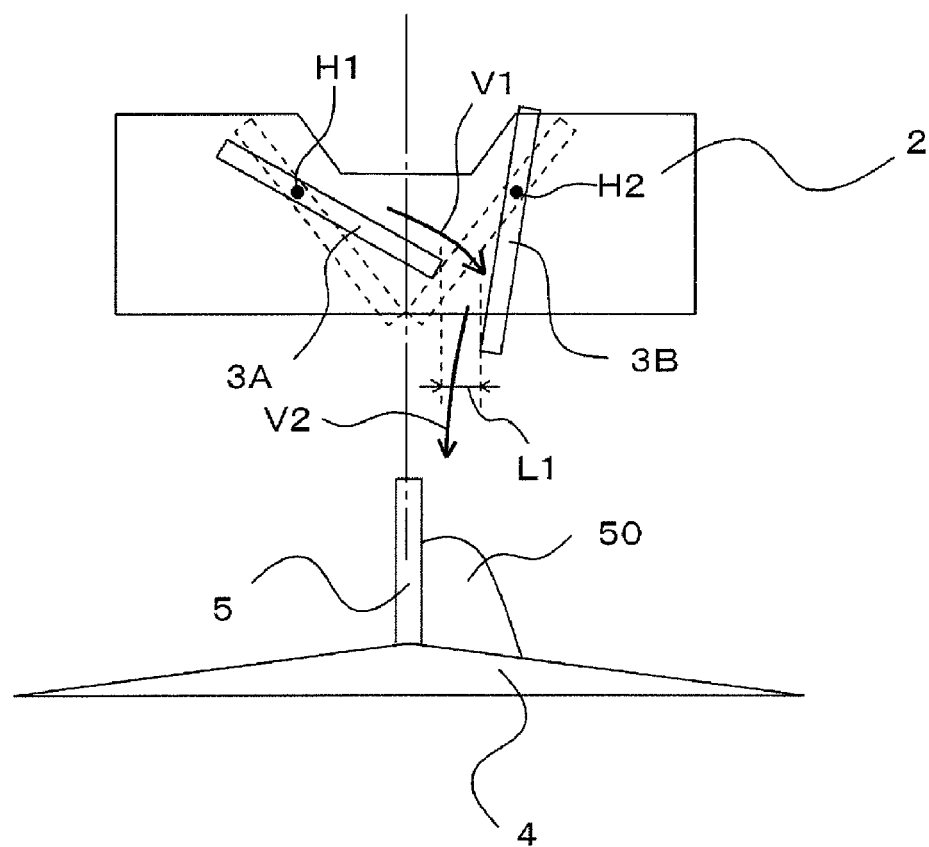
FIG. 13 is a side view showing a situation in which articles are cast onto the right half of a dispersal table according to the second embodiment.

FIG. 13 is a side view showing a situation in which articles are cast onto the right half of the dispersal table 4. The gate 3B turns counterclockwise on an axis H2 from the state in FIG. 9 and maintains the posture, rendering the slope angle of the gate 3B steeper than that of the gate 3A. In other words, the gate 3A forms a gentle slope sliding surface, and the gate 3B forms a steep slope sliding surface. Then, as indicated by arrows V1 and V2 in FIG. 13, articles 50 accumulated in the article supplying device 2 drop following the shape of a parabola toward the opposing gate 3B on the steep slope side, with momentum gained from sliding down the gate 3A on the gentle slope side, and then change the sliding trajectory inward upon bumping into the gate 3B. The articles 50 then drop following the shape of a parabola toward the center area of the dispersal table 4, with momentum gained from sliding down the gate 3B. As a result, the articles 50 are piled up at the center area of the dispersal table 4 as shown in FIG. 13.

Here, as shown in FIG. 13, the gate 3B turns counterclockwise on an axis H2 from the state in FIG. 9 and maintains the posture, thereby allowing an open area (W*L1) of a slot, which is given by multiplication between a dimension W in FIG. 12 and a dimension L1 in FIG. 13, to be adjusted by an amount of turn of the gate 3B. Thereby, arbitrary adjustment of an amount of articles cast from the article supplying device 2 onto the dispersal table 4 is achieved. For example, an optimal amount of turn of the gate on the steep slope side may be registered for each type of articles in a memory device in advance, and by inputting the type of an article subject to weighing at present, the amount of turn corresponding to the type is read from the memory device automatically and is set as the amount of turn of the gate 3B.

While the gate 3A is turned counterclockwise in FIG. 13, by turning the gate 3A clockwise, articles can be cast onto both right half and left half of the dispersal table 4.

Figure 14:
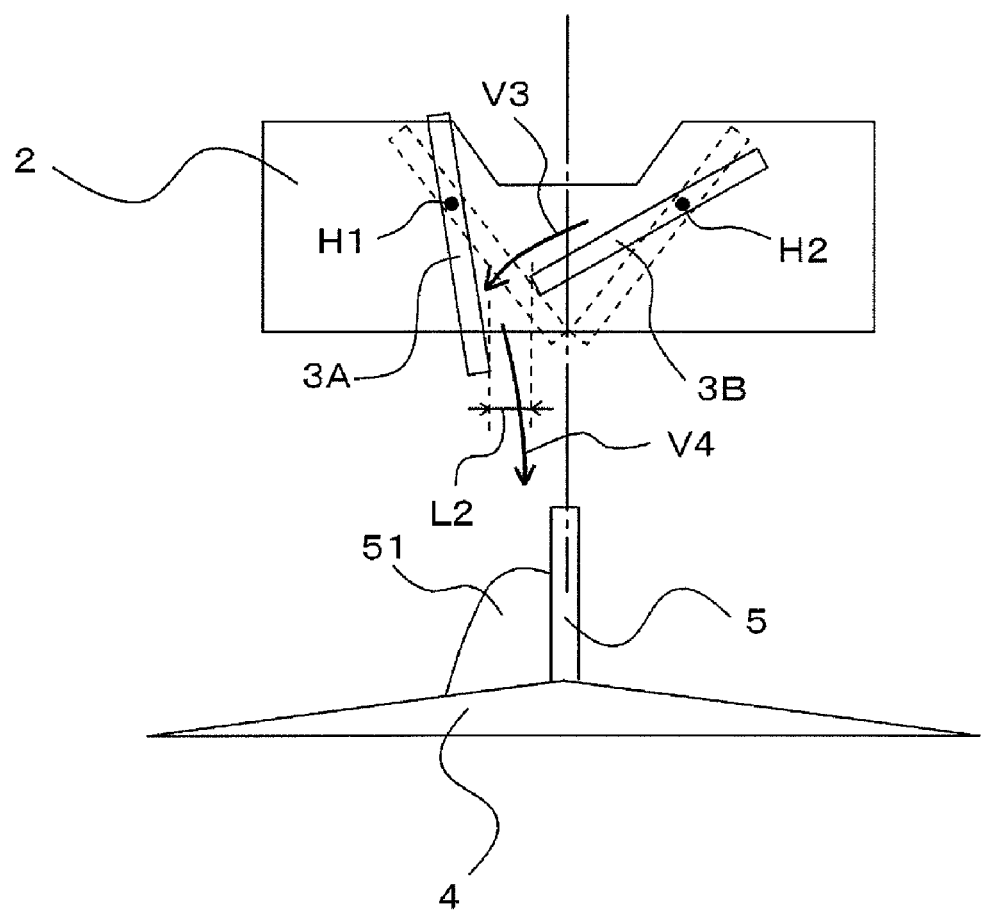
FIG. 14 is a side view showing a situation in which articles are cast onto the left half of a dispersal table according to the second embodiment.
Figure 15:
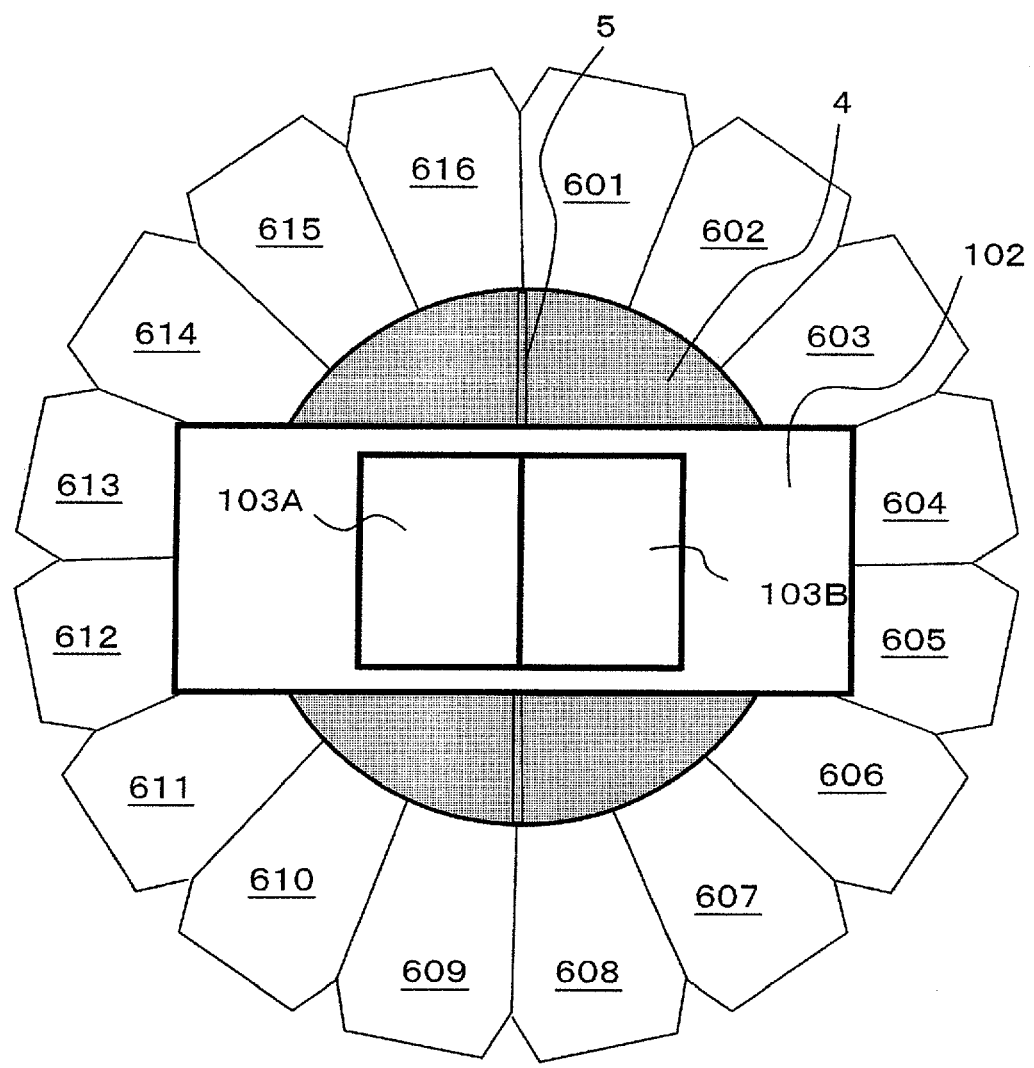
FIG. 15 is a top view schematically showing a part of a structure of a conventional combination weighing device.
Figure 16:
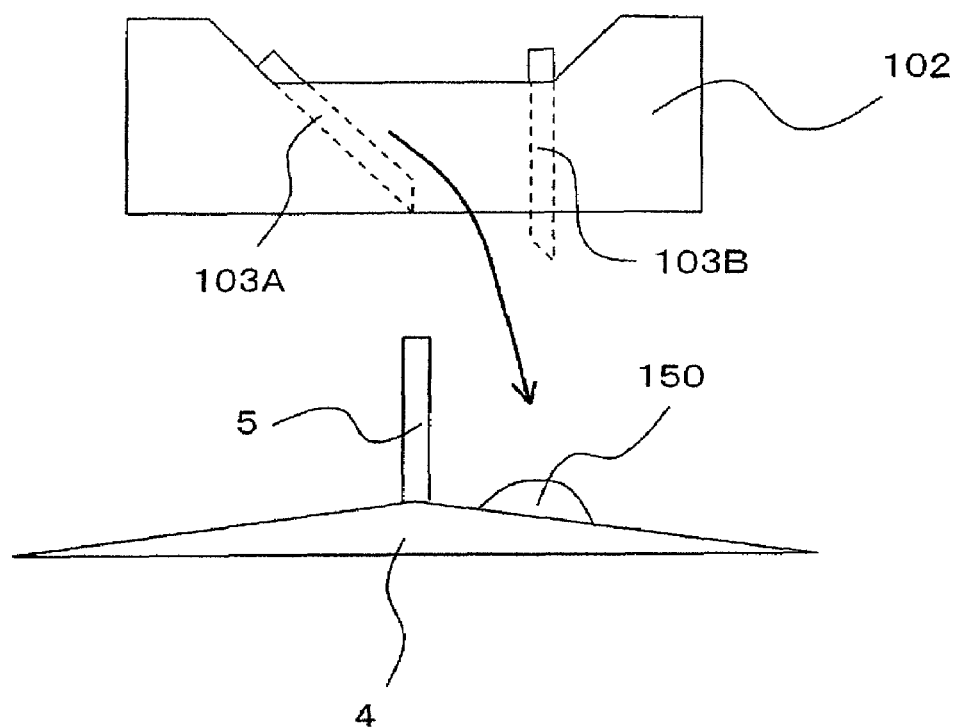
FIG. 16 is a side view showing a gate of the conventional combination weighing device in FIG. 15 being open.

FIG. 14 is a side view showing a situation in which articles are cast onto the left half of the dispersal table 4. The gate 3A turns clockwise on an axis H1 from the state shown in FIG. 9 and maintains the posture, rendering the slope angle of the gate 3A steeper than that of the gate 3B. In other words, the gate 3A forms a steep slope sliding surface, and the gate 3B forms a gentle slope sliding surface. Then, as indicated by arrows V3 and V4 in FIG. 14, articles 51 accumulated in the article supplying device 2 drop following the shape of a parabola toward the opposing gate 3A on the steep slope side, with momentum gained from sliding down the gate 3B on the gentle slope side, and then change the sliding trajectory inward upon bumping into the gate 3A. The articles 50 then drop following the shape of a parabola toward the center area of the dispersal table 4, with momentum gained from sliding down the gate 3A. As a result, the articles 51 are piled up at the center area of the dispersal table 4 as shown in FIG. 14.

Here, as shown in FIG. 14, the gate 3A turns clockwise on an axis H1 from the state in FIG. 9 and maintains the posture, thereby allowing an open area (W*L2) of a slot, which is given by multiplication between a dimension W in FIG. 12 and a dimension L2 in FIG. 14, to be adjusted by an amount of turn of the gate 3A. Thereby, arbitrary adjustment of an amount of articles cast from the article supplying device 2 onto the dispersal table 4 is achieved.

While the gate 3B is turned clockwise in FIG. 14, by turning the gate 3B counterclockwise, articles can be cast onto both left half and right half of the dispersal table 4.

In the above explanation, an example of adjusting a slope angle of a gate on the steep slope side for adjusting an open area of a slot is described. However, a slope angle of a gate on the gentle side may also be adjusted, for example in accordance with stickiness of an article. By setting the slope of a gate on the gentle slope side at a steep angle for a sticky article and setting at a gentle angle for a less sticky article, amount of articles cast from the article supplying device 2 onto the dispersal table 4 can be maintained evenly regardless of the stickiness of the articles. For example, an optimal amount of turn of the gate on the gentle slope side may be registered for each type of articles of different stickiness in a memory device in advance, and by inputting the type of an article subject to weighing at present, the amount of turn corresponding to the type is read from the memory device automatically and is set as the amount of turn of the gate on the gentle slope side.

In this way, according to the article supplying device 2 of the weighing device in the second embodiment, as shown in FIG. 13, for example, articles 50 slide down the gate 3A on the gentle slope side, change sliding trajectory upon bumping into the opposing gate 3B on the steep slope side, and drop toward the center area of the dispersal table 4. Thus, articles 50 can be evenly supplied for each of the plurality of feed troughs 6 arranged along the circumference of the dispersal table 4, thereby achieving even supply of the articles 50 for each of the plurality of weighing sections 7. As a result, accuracy in weighing and a rate of operation of a whole combination weighing device can be improved.

The invention claimed is:

1. A weighing device comprising:
 a dispersal table;
 a plurality of feeding sections arranged along a circumference of the dispersal table;
 a weighing section respectively arranged below each of the feeding sections; and
 a casting unit arranged above the dispersal table to cast an article onto the dispersal table,
 the casting unit including a pair of gates arranged to open and close independently so that a sliding trajectory of the article that has slid down one of the gates forming a gentle slope sliding surface changes upon the article bumping into an opposing one of the gates forming a steep slope sliding surface to drop the article toward a center area of the dispersal table,
 the sliding surface of each of the gates having a generally semicone shape.

2. The weighing device according to claim 1, wherein each of the gates is opened and closed in such a way that a bottom edge of the gate follows trajectory approximately in the shape of a parabola being convex upward upon opening and closing.

3. A method of driving first and second gates mounted in a weighing device having a dispersal table, a plurality of feeding sections arranged along a circumference of the dispersal table, and a weighing section respectively arranged below each of the feeding sections, with the first and second gates being arranged above the dispersal table, the method comprising:
 changing a slope angle of the first gate to move a lower end of the first gate across a vertical center line of the dispersal table so that a sliding trajectory of an article that has slid down the first gate forming a gentle slope sliding surface changes upon the article bumping into the second gate forming a steep slope sliding surface to drop the article toward a center area of the dispersal table.

4. The method according to claim 3, further comprising adjusting an open area of a slot formed between the first and second gates by changing a slope angle of the second gate forming the steep slope sliding surface.

5. The method weighing device in according to claim 3, wherein
 the changing of the slope angle of the first gate includes adjusting the slope angle of the first gate forming the gentle slope sliding surface in accordance with stickiness of the article.

6. A method of driving first and second gates mounted in a weighing device having a dispersal table including a partition formed on a top surface thereof, a plurality of feeding sections arranged along a circumference of the dispersal table, and a weighing section respectively arranged below each of the feeding sections, with the first and second gates being respectively arranged on first and second sides of the partition above the dispersal table, the method comprising:
 changing a slope angle of the first gate to move a lower end of the first gate into the second side of the partition so that a sliding trajectory of an article that has slid down the first gate forming a gentle slope sliding surface changes upon the article bumping into the second gate forming a steep slope sliding surface to drop the article toward a center area of the dispersal table.

7. The method according to claim 6, further comprising adjusting an open area of a slot formed between the first and second gates by changing a slope angle of the second gate forming the steep slope sliding surface.

8. The method according to claim 6, wherein
 the changing of the slope angle of the first gate includes adjusting the slope angle of the first gate forming the gentle slope sliding surface in accordance with stickiness of the article.

* * * * *